Patented Nov. 19, 1940

2,222,357

UNITED STATES PATENT OFFICE 2,222,357

TETRAHYDRO ARYL-ALKYL KETONES AND METHOD FOR PREPARING THEM

William D. Wolfe, Cuyahoga Falls, Ohio, assignor to Wingfoot Corporation, Wilmington, Del., a corporation of Delaware No Drawing. Application February 25, 1939, Serial No. 258,582

11 Claims. (Cl. 260—586)

This invention relates to certain new compositions of matter and to a method by which the same may be prepared. More particularly, it relates to $\Delta^3$ tetrahydro acetophenone and related compounds.

In the course of investigations looking to the preparation of synthetic rubber by the copolymerization of certain unsaturated compounds it has been discovered that a butadiene and an alkyl vinyl ketone react to produce only a small amount of polymeric material, the main product of the reaction being a pleasant smelling oil which is found to be a definite chemical compound. In the case of butadiene and methyl vinyl ketone the reaction apparently proceeds in the following manner:

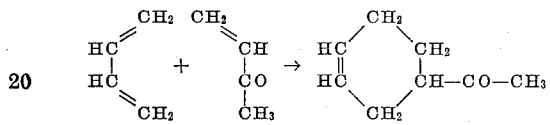

the methyl vinyl ketone adding on to the butadiene to form a hydrogenated ring which may be considered as substituted on the carbonyl group of the resulting ketone. Thus, in the case illustrated, butadiene and methyl vinyl ketone yield $\Delta^3$ tetrahydro acetophenone.

In the preparation of this compound, equal parts of butadiene and methyl vinyl ketone are placed in an aqueous emulsion containing an emulsifying agent, such as sodium oleate, an oxidizing agent, such as sodium perborate, and possibly a catalyst such as carbon tetrachloride. The emulsion is then heated for an extended period of time, sometimes as long as several days, at a temperature in the neighborhood of 50° C. Upon completion of the reaction, a small amount of a soft polymeric material is found together with a considerable amount of a pleasant smelling oil which boils at 185-7° C. under 745 mm. of mercury, has a refractive index of 1.4680 at 23° C., and a density of 0.942g./cc. at 25° C. The compound is believed to have the formula given above for $\Delta^3$ tetrahydro acetophenone, a compound not heretofore described.

The method may also be used to prepare other compounds of the same class, such as homologues of $\Delta^3$ tetrahydro acetophenone, by reacting with a butadiene, for example, butadiene, 1:3, isoprene or dimethyl butadiene, an appropriate alkyl vinyl ketone. In this manner there can be prepared ethyl, propyl, isopropyl, and butyl ketones in which the other substituent of the carbonyl group is a $\Delta^3$ tetrahydro benzene, or toluene or xylene, or similar nucleus, by reacting with butadiene, methyl butadiene or dimethyl butadiene, ethyl vinyl ketone, propyl vinyl ketone, isopropyl vinyl ketone and butyl vinyl ketone respectively. In general, the class of compounds which may be termed $\Delta^3$ tetrahydro aryl alkyl ketones, i. e., $\Delta^3$ tetrahydro aryl ketones in which the carbonyl group is attached to an alkyl radical, can thus be prepared. However, it is preferred to use the method in connection with the reaction of such alkyl vinyl ketones as have from 1 to 4 carbon atoms in the alkyl group. So far as known, neither $\Delta^3$ tetrahydro acetophenone or the related compounds has previously been prepared.

The conditions under which the reaction is carried out may be varied but, generally speaking, a temperature of 30°-80° C. is employed and heating is continued until the reaction is complete or substantially complete, a matter of 2, 3 or 4 days or longer. The butadiene and alkyl vinyl ketone will ordinarily be present in equimolecular amounts but, of course, these proportions may be varied without affecting the ratio in which the constituents combine. The emulsion used for the reaction may also be varied, the emulsifying agent being sodium oleate, as mentioned, Aquarex D (a sodium sulfate ester of higher alcohols) or other emulsifying agents of the type used in copolymerizations, although the present reaction produces very little polymer. The oxidizing agent used may be sodium perborate, benzoyl peroxide and the like. A catalyst such as carbon tetrachloride, trichloro propionitrile or other halogen compound is found to be helpful.

However, the conditions of the reaction may be modified extensively without departing from the scope of the invention and, accordingly, no limitation should be inferred from the description given, the invention being commensurate with the appended claims wherein it is intended to set forth all features of patentable novelty residing in such invention.

What I claim is:

1. A method of preparing $\Delta^3$ tetrahydro aryl alkyl ketones which comprises reacting a butadiene with an alkyl vinyl ketone.

2. A method of preparing $\Delta^3$ tetrahydro aryl ketones in which the carbonyl group is attached to an alkyl radical which comprises reacting a butadiene with a vinyl ketone containing said alkyl group.

3. A method of preparing $\Delta^3$ tetrahydro acetophenone and its homologues which comprises reacting butadiene with an alkyl vinyl ketone.

4. A method of preparing $\Delta^3$ tetrahydro acetophenone and its homologues which comprises reacting butadiene with an alkyl vinyl ketone in which the alkyl group contains from one to four carbon atoms.

5. A method of preparing $\Delta^3$ tetrahydro acetophenone and its homologues which comprises heating at a temperature of about 30° to 80° C. butadiene and an alkyl vinyl ketone in which the alkyl group contains from one to four carbon atoms.

6. A method of preparing $\Delta^3$ tetrahydro acetophenone which comprises reacting butadiene with methyl vinyl ketone.

7. The $\Delta^3$ tetrahydro benzene alkyl ketones in which the alkyl group contains from one to four carbon atoms.

8. $\Delta^3$ tetrahydro acetophenone.

9. A method of preparing $\Delta^3$ tetrahydro aryl alkyl ketones which comprises reacting a butadiene with an alkyl vinyl ketone in an aqueous emulsion containing an emulsifying agent and an oxidizing agent at a temperature of about 30° to 80° C. for a period of several days.

10. A method of preparing $\Delta^3$-tetrahydro acetophenone and its homologues which comprises reacting butadiene and an alkyl vinyl ketone in an aqueous emulsion containing an emulsifying agent and an oxidizing agent at a temperature of about 30° to 80° C. for a period of several days.

11. A method of preparing $\Delta^3$-tetrahydro acetophenone and its homologues which comprises reacting butadiene and an alkyl vinyl ketone in which the alkyl group contains from one to four carbon atoms in an aqueous emulsion including sodium oleate and sodium perborate at a temperature of about 50° C. for a period of several days.

WILLIAM D. WOLFE.